Nov. 27, 1962  A. A. LEBERMANN  3,065,581
AUTOMATIC WORK HEAD AND INDEXING DEVICE
Filed Nov. 7, 1961  5 Sheets-Sheet 1
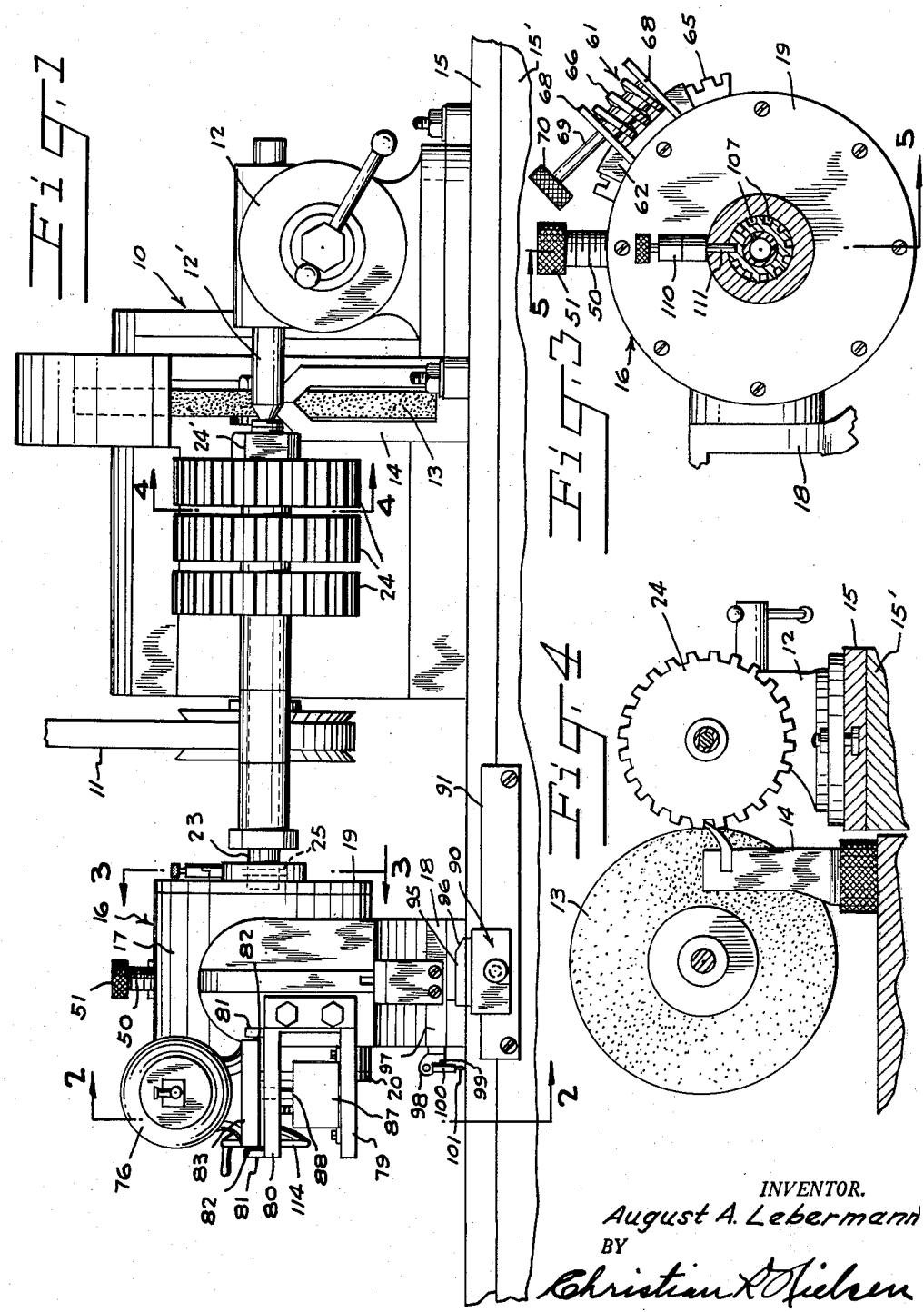
INVENTOR.
August A. Lebermann
BY
Christian L Nielsen
ATTORNEY

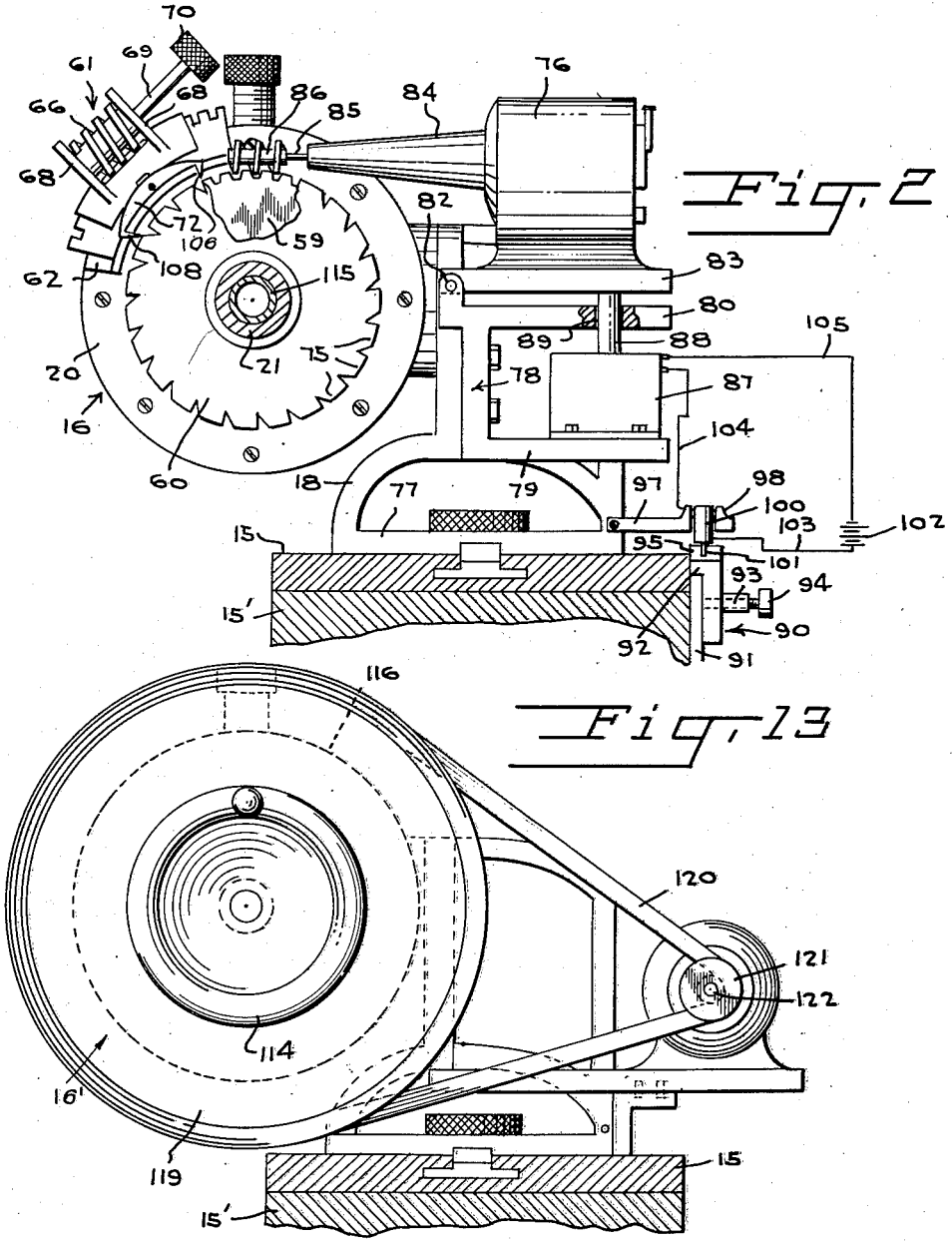

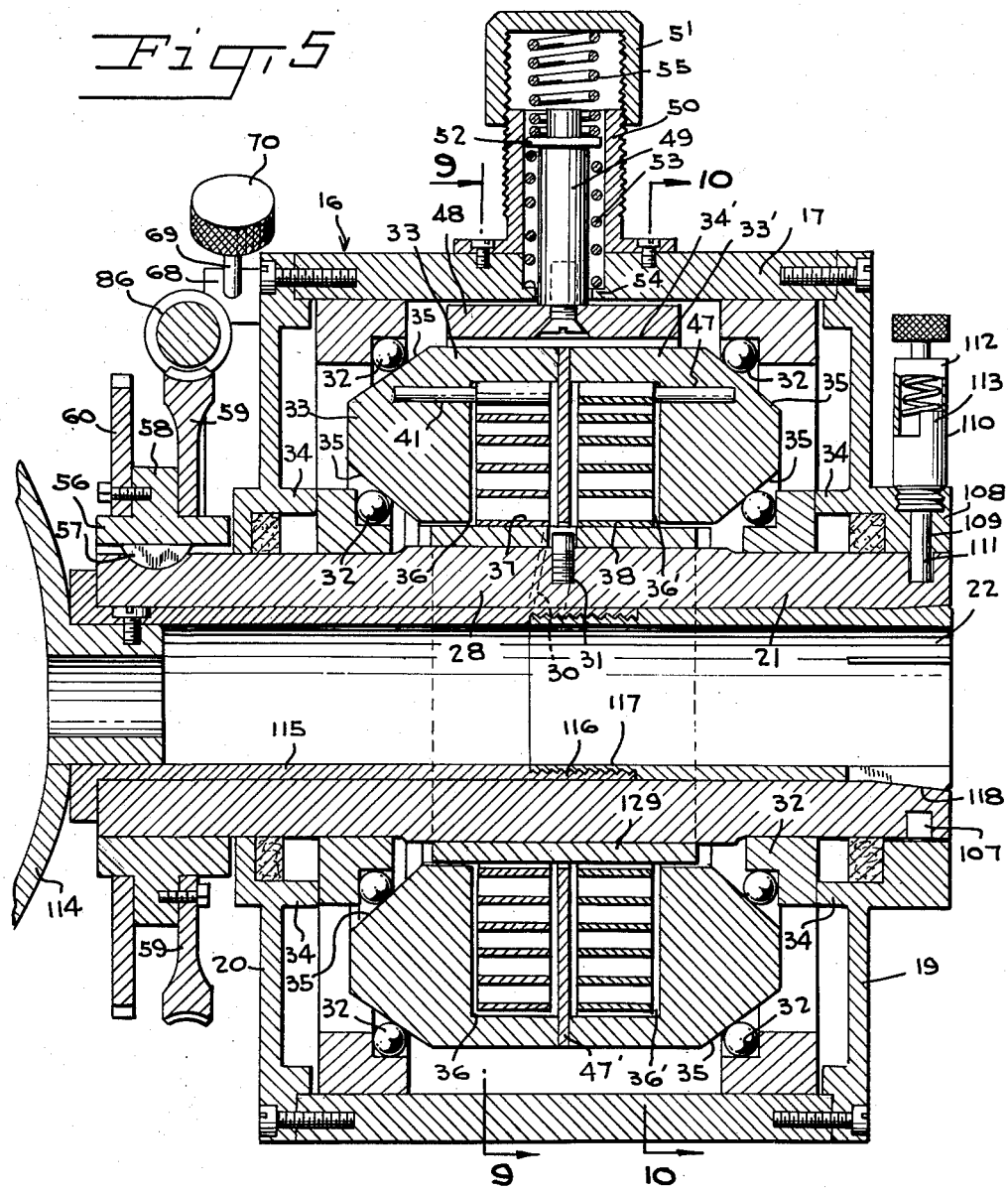

Nov. 27, 1962  A. A. LEBERMANN  3,065,581
AUTOMATIC WORK HEAD AND INDEXING DEVICE
Filed Nov. 7, 1961  5 Sheets-Sheet 4
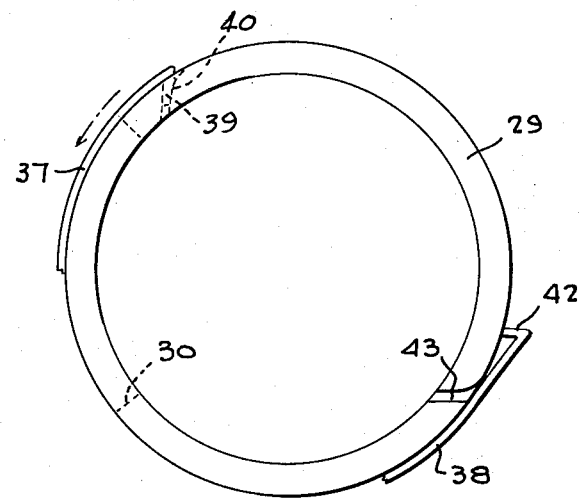
*Fig. 6*
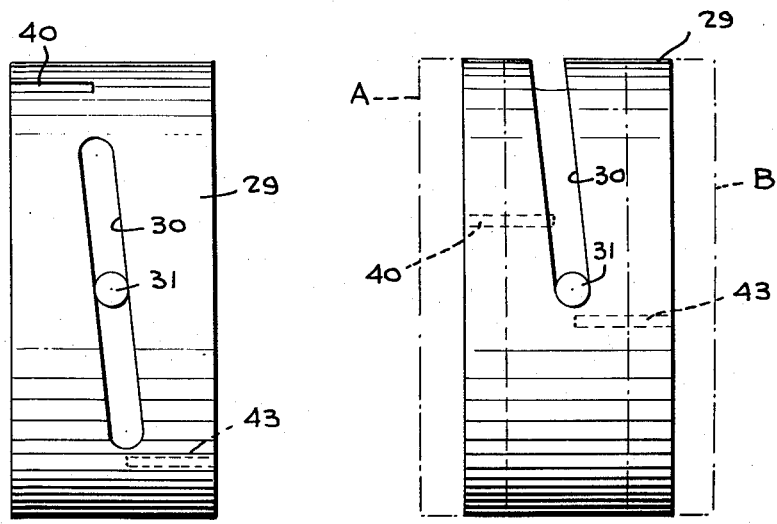
*Fig. 7*  *Fig. 8*
INVENTOR.
August A. Lebermann
BY
Christian L. Nielsen
ATTORNEY Nov. 27, 1962  A. A. LEBERMANN  3,065,581
AUTOMATIC WORK HEAD AND INDEXING DEVICE
Filed Nov. 7, 1961  5 Sheets-Sheet 5

INVENTOR.
August A. Lebermann
BY
Christian R. Nielsen
ATTORNEY

United States Patent Office 3,065,581
Patented Nov. 27, 1962

3,065,581
AUTOMATIC WORK HEAD AND
INDEXING DEVICE
August A. Lebermann, Gardena, Calif.
(13636½ Cerise Ave., Hawthorne, Calif.)
Filed Nov. 7, 1961, Ser. No. 150,824
10 Claims. (Cl. 51—225)

This invention relates to an automatic work head and indexing device for use on cutter and surface grinders, and it consists in the constructions, arrangements and combinations herein described and claimed.

It is an object of the invention to provide an automatic work head and indexing device wherein a plurality of milling cutters having an equal number of teeth may be simultaneously sharpened, regardless of irregularity of spacing of the teeth in milling machine cutters, which vary in manufacturing inaccuracies.

It is a still further and important object of the invention to provide a combined work head and indexing device wherein a spindle for support of the arbor is spring connected with a circumscribing cylindrical housing, an indexing disk being secured to said spindle; a clockwise rotation of the indexing disk creating a counter-clockwise spring tension on the spindle and a tooth rest employed in the device, there being an adjustable brake cooperable with the cylindrical housing for maintaining such tension upon the spindle.

A further object of the invention is the provision of novel means for connecting an arbor with the spindle, which functions as the work head, without the need for the usual dog.

Additional objects, advantages and features of invention will be apparent from the following description, considered in conjunction with the accompanying drawings, wherein:

FIGURE 1 is a front elevation of a grinder having an indexing head installed thereon, FIGURE 2 is a vertical section on the line 2—2 of FIGURE 1.

FIGURE 3 is a section taken on the line 3—3 of FIGURE 1.

FIGURE 4 is a vertical section on the line 4—4 of FIGURE 1, illustrating the relation of the cutter, tooth rest and grinder, FIGURE 5 is an enlarged vertical section through the indexing head, taken on the line 5—5 of FIGURE 3.

FIGURE 6 is an end elevation of a sleeve employed upon the spindle for controlling the function of springs employed in the index head.

FIGURE 7 is a plan elevation of the sleeve.

FIGURE 8 is a similar view illustrating in dotted lines positions of movements of the sleeve to release and engage anchorage members of the springs.

FIGURE 13 is an end elevation of the work head illustrating a modified form of a drive employed in cylindrical grinding operations.

Figure 9:
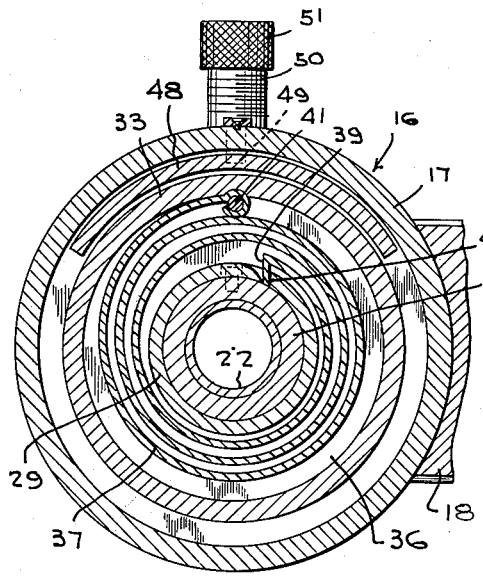
FIGURE 9 is a section on the line 9—9 of FIGURE 5.
Figure 10:
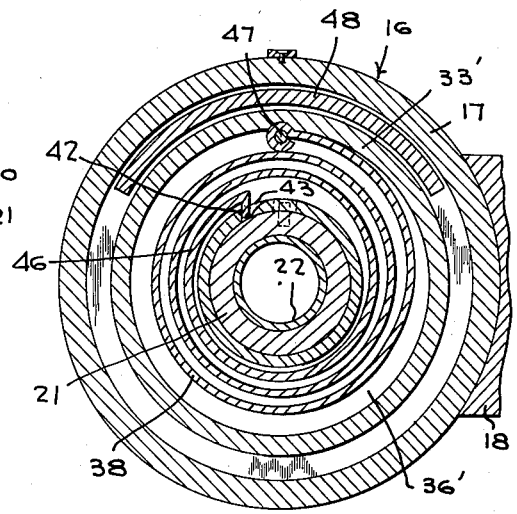
FIGURE 10 is a section on the line 10—10 of FIGURE 5.

Attention is first invited to FIGURE 1 of the drawings, wherein there is illustrated a grinder 10, including a drive 11, a tail stock 12, grinding wheel 13 and tooth rest 14 which are conventional in grinders of the type illustrated.

The tail stock 12 is mounted upon a reciprocating table 15 supported upon a base 15' and in horizontal alignment therewith and likewise carried by the table is my combined work head and indexing device 16. The table 15 is reciprocated in the usual manner to bring the cutters transversely across the dressing edge of the grinding wheel 13, and since this structure forms no part of the present invention, details thereof are not shown.

As clearly shown in FIGURES 1, 2, 3, 5, 9 and 10, the combined work head and indexing device 16 comprises a cylindrical housing 17 having a base 18 for securement to the table 15, as well as to support a drive means for the work head. The housing 17 has removable closure plates 19 and 20 secured to respective ends of the housing by suitable bolts. Between the plates 19 and 20 there is oscillatably mounted a hollow spindle 21 which functions as a support for a collet or chuck 22 for reception of an arbor 23, the other end of the arbor being supported by the center 12' of the tail stock 12. In the present instance, I have shown three cutters 24 mounted in spaced relation upon the arbor and secured by means of a nut 24' threaded upon the arbor.

As shown in dotted lines in FIGURE 1, the arbor 23 is formed with an enlarged annular collar 25 having a radial periphery adapted to be operatively engaged within the collet or chuck 22, the arrangement being such as to provide a universal movement of the arbor to insure proper centering with respect to center 12' of the tail stock. The above structure is the subject matter of a separate application, and it is believed that the above is sufficient explanation of the structure for an understanding of the operation of the work head and indexing device.

In order that the interior structure of the indexing device may be understood, attention is now invited to FIGURES 5, 6, 7, and 8 of the drawings, wherein it will be seen that the spindle 21 is formed with an intermediate annular enlargement 28 upon which a sleeve 29 is mounted for partial longitudinal movements upon the spindle for a purpose presently to be explained, and to this end the sleeve is provided with a diagonally inclined slot 30 for reception of a stud 31 mounted medially of the enlargement 28 of the spindle Bearing assemblies 32 support the spindle at opposite ends, as well as respective oscillatable drums 33 and 33', the bearing assemblies being retained in position by virtue of shoulders 34 on the closure plates 19 and 20.

The drums 33 and 33' are of identical construction, and are formed with inner and outer tapered faces 35 for contacting engagement with inner and outer bearings of the bearing assemblies.

The drums are provided with an interior annular chamber 36 and 36' arranged in opposed relation for housing respective springs 37 and 38. The spring 37 is arranged in counter clockwise relation with respect to the rotation of the spindle 21, the inner end of the spring having a hook member 39 for engagement with a kerf 40 formed in the outer periphery of the sleeve 29. The other end of the spring 37 being anchored as at 41 within and to the drum 33. The spring 38 is arranged within the drum 33' for clockwise rotation of the spindle and includes a hooked end 42 engaged in a kerf 43. The other end of the spring 38 is anchored to the drum 33' as at 47 (see FIGURES 9 and 10). A division plate 47' is freely carried by the sleeve 29 and is interposed between the springs and drums to prevent contacting engagement between the springs.

The spring 37 is wound in a counter clockwise direction so as to produce a clockwise movement of the spindle 21 and an associated arbor; and the spring 38 is wound clockwise so as to properly position a tooth of a cutter against the tooth rest 14 in advance of the grinder wheel 13.

Reference is now made particularly to FIGURES 6, 7 and 8 wherein in FIGURE 6, the hook 39 of the spring 37 is seated in the kerf 40, the tension of the spring rotating the spindle in a counter clockwise direction and by reason of the fact that the stud 31 of the spindle 21 is engaged in the slot 30 a lengthwise movement of the sleeve 29 will be effected as indicated in dotted lines at A, FIGURE 8. Such lengthwise movement of the sleeve will release the hook 42 of the spring 38 permitting the hook to ride upon the periphery of the sleeve, as indicated in FIGURE 6. When the cycle has been completed and the spindle 21 returns to normal position and to the opposite end of the slot, the stud 31 will shift the sleeve 29 to the position shown in dotted lines at B, whereupon the hook 42 of the spring 38 will seat in the kerf 43 and the spring being wound in a clockwise direction will cause the hook 39 of the spring to become disengaged from the kerf 40. It should be understood that at all times, one or the other of the hooks 39 or 42 are engaged in their respective kerfs.

In order that unwinding movement between the spindle 21 and the drums 33 and 33' may be effectively controlled, a semi-circular brake shoe 48 is positioned concentrically upon the drums 33 and 33' (see FIGURES 5, 9 and 10) and is held in a fixed medial position thereon by means of a pin 49 engaged in a suitable opening formed in the brake shoe. The pin 49 is supported by means of a sleeve 50 fixed on the housing 17. The sleeve is exteriorly threaded for reception of a threaded cap 51 for actuating the pin 49. The pin 49 has a collar 52 adjacent its upper end and a helical spring 53 is positioned on the bolt and is interposed between the collar 52 and an annular shoulder 54, the spring thus tending to elevate the brake shoe 48. A second spring 55 is employed, arranged in opposed relation to the spring 53 and as shown in FIGURE 5, one end of the spring 55 is seated upon the upper face of the collar 52, while the other end of the spring is seated against the inner top wall of the cap 51. Obviously, rotation of the cap 51 in a desired direction will vary the adjustment of the brake shoe 48 with respect to the drums 33 and 33'. By loosening the pin 49, the friction grip upon the drums will be reduced and by increasing the pressure on the pin the friction grip will be increased; and it will thus be apparent that any desired movement between the spindle 21 and the drums 33 and 33' may be obtained.

The spindle 21 projects a distance beyond the closure plate 20 and has a hub 56 keyed thereto, as at 57. The hub 56 has an intermediately positioned annular flange 58 upon the inner side of which there is secured a spur gear 59. An indexing disk 60 is secured to the outer side of the flange 48. From the foregoing it will be seen that the spindle 21, spur gear 59 and the indexing disk 60 will be rotated in unison, as will be further explained.

Figure 12:
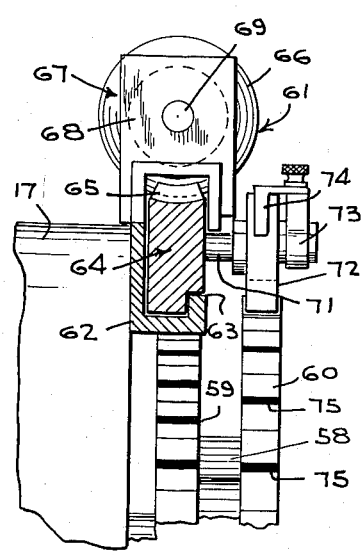
FIGURE 12 is an enlarged cross section on the line 12—12 of FIGURE 11.
Figure 11:
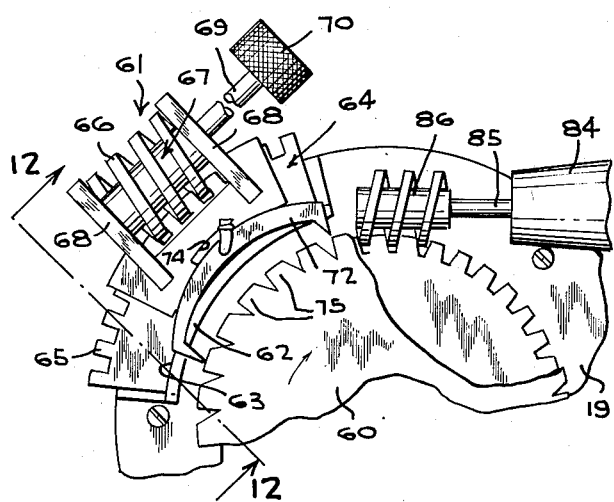
FIGURE 11 is a fragmentary elevation of the drive for the indexing disk.

As best seen in FIGURES 2, 11 and 12, the indexing disk 60 has associated therewith an adjustable detent means 61 which as here shown comprises an arcuate trackway 62 which is suitably mounted rigidly to the closure plate 20 adjacent the upper periphery thereof. The trackway is of substantially C-shaped formation as seen in cross section (see FIGURE 12), the open side 63 being presented in the direction of the indexing disk 60. An arcuate shaped gear rack 64 is adjustably mounted in the trackway, the teeth 65 thereof being upwardly presented for meshing engagement with teeth 66 of a worm gear 67, the latter being revolubly mounted between spaced parallel brackets 68 rigidly secured to the upper portion of the trackway 62. A shaft 69 forming the bearing of the worm gear 67 projects beyond one of the brackets 68 and has secured thereto a knurled operating head 70 for rotating the worm gear 67 to effect movement of the gear rack 64. A shaft 71 integrally formed upon the gear rack 64 projects laterally through the open side 63 of the trackway and overlies the indexing disk 60. A double acting pawl 72 is rockably mounted upon the shaft 71, and this shaft also mounts a collar 73 outwardly of the pawl, the collar providing means for support of a leaf spring 74 which engages upon the pawl 72 and holds the teeth of the latter into engagement with the indexing disk 60.

The indexing disk 60 is formed with ratchet teeth 75 formed in the periphery thereof, the number of teeth corresponding to the number of teeth of the cutter to be sharpened, and since the cutters must be advanced in a step-by-step rotation by means of the clockwise rotation of the indexing disk 60, a tooth of the pawl 72 will engage a tooth of the indexing disk to rotate the same one tooth. The pawl 72 is mounted on the rack bar 64 which is adjustably mounted in the trackway 62, and thus the pawl 72 may be adjusted to various spacing of the teeth of different indexing disks. It will be remembered that the spring 37 is wound in a counter clockwise direction thereby producing a clockwise rotation of the spindle 21 and associated arbor, thereby providing the necessary spring tension on the tooth at the tooth rest.

The drive for the gear 59 and the index disk 60 is effected through an electric motor 76 as will now be described. The frame 18 of the combined work head and indexing device 16 comprises a suitable base 77 which is secured upon the the table 15. The base 77 is located medially of the longitudinal axis of the table 15 and properly supports the work head in alignment with the tail stock 12. The frame 18 also has a motor supporting frame 78 bolted thereto, as best seen in FIGURES 1 and 2, extending rearwardly of the frame 18 so as to properly align the motor 76 with the worm gear 59. The frame 78 is substantially U-shaped (see FIGURE 2) providing horizontally disposed brackets or arms 79 and 80. The arm 80 is provided with a pair of upstanding spaced apart ears 81 adapted to receive respective trunnions 82 projecting from the base 83 of the motor. The motor 76 has a bearing 84 for support of a drive shaft 85, the bearing being of elongated form to amply support the shaft against vibrations. The shaft has a worm gear 86 secured thereto which is intermittently engaged with the teeth of the worm gear 59, as will be explained.

The bracket or arm 79 has mounted thereon a solenoid 87, the armature 88 of which is presented vertically and passes through an opening 89 formed in the bracket 80, the armature being of a length so as to elevate the motor 76 to a horizontal position when the solenoid is energized, to effect meshed engagement of the gears 59 and 86 as shown in FIGURE 2.

In order that the energization of the solenoid 87 may be properly controlled, a trip 90 is employed. As clearly shown in FIGURES 1 and 2, the trip comprises a steel plate 91 of a length greater than the length of the work head and indexing device is secured to the base 15'. As best seen in FIGURE 2, the plate 91 projects laterally from the base 15' and the table 15, the top edge being positioned below the upper face of the table forming a supporting surface for an offset extension 92 of the trip 90. The trip 90 is a permanent magnet and may be adjustably mounted at desired points along the plate 91. In order to conveniently break the magnetism between the plate and the magnet, a right angularly disposed sleeve 93 is secured to the body of the magnet opening upon the side next adjacent the plate 91. The sleeve is interiorly threaded and receives a knurled headed bolt 94, which upon being screwed into the sleeve will engage the plate 91 and force the magnetic member away from the steel plate 91. By retracting the bolt 94, the trip member may be replaced upon the plate at a desired position. The trip member 90 has an elongated trackway 95 having a cam face 96 (see FIGURE 1) inclined in the direction of grinding movement of the table 15.

An arm 97 secured to the frame 18 projects beyond the trip member 90 and is provided with a pair of ears 98 positioned at an upper portion of the arm thereby forming a shoulder 99. A micro switch 100 is pivotally mounted between the ears 98 and normally depends therefrom in contacting engagement with the shoulder 99. The switch has an actuating stem 101 which is forced inwardly to complete a circuit to the solenoid during travel along the track way of the trip device.

As shown in FIGURE 2, the circuit for energizing the solenoid comprises a battery 102 from which a line 103 is connected to the micro switch 100. A line 104 leads from the switch to one side of the solenoid, the circuit being completed by a line 105 which leads back to the battery 102. From the position shown in FIGURE 1, it will be seen that upon return movement of the table 15, the switch 100 will swing from its vertical position so as to slide upon the trackway 95 without actuating the stem 101, yet when the table moves in the opposite direction, the switch 100 will rest against the shoulder 99 and when the stem engages the cam 96 and rides upwardly thereon to engage the trackway 95, the stem 101 will be forced upwardly so as to close the circuit to the solenoid. When this action takes place the solenoid will be energized to tilt the motor 76, the latter swinging on the trunnions 82. The motor is continuously rotating and likewise the shaft 85 and thus when the motor is tilted, the worm gear 86 will engage the teeth of the gear 59 effecting rotation thereof, as well as the index disk 60 in the direction of the arrow shown in FIGURE 2, the pawl 72 being in releasing position. When the carriage 15 has moved to a point of its travel where the switch 100 disengages the trackway 95, the stem 101 of the switch will be urged downwardly, thus breaking the circuit to the solenoid, lowering the motor to an inoperative position with the gears 59 and 86 disengaged. The pawl 72 being under spring tension by virtue of the spring 74 will cause the tooth 106 to engage a tooth 75 of the index disk 60 preventing counter clockwise rotation of the spindle 21.

The tension of the spring 37 may be adjusted by rotating the indexing disk in a counter clockwise direction and adjusting the frictional contact between the brake shoe and the drums 33 and 33' by adjustment of the bolt 49. When the indexing disk 60 is rotated, the spindle and the drums 33 and 33' move as a unit.

It will be understood that when the indexing disk 60 and spindle 21 are advanced in a clockwise direction, a tooth of the cutter was advanced into position to rest upon the tooth rest 14. The cutter tooth is firmly held to the top of the tooth rest 14 through the counter-clockwise tension applied to the spindle 21 through the tension of the spring 38.

It is of course necessary to employ various indexing disks to accommodate different grinding operations, and in order that the tension of the spring 37 may be maintained, when the indexing disk is removed for substitution of another disk, the spindle 21 is formed with a multiplicity of notches 107 (see FIGURE 3) around the periphery inwardly of the arbor supporting end thereof. The closure plate 19 includes a hub 108 having an opening 109 formed therethrough aligned with the notches 107. A cylindrical casing 110 is secured to the hub and has mounted therein a spring-pressed plunger 111. The plunger 111 being spring urged maintains the plunger in engagement with a notch 107 of the spindle holding the same against rotation. In such position of the plunger 111, the indexing disk 60 may be removed and a different indexing disk installed. The casing 110 is formed in two parts 112 and 113 each having a complemental shoulder 113'. When the new indexing disk is secured to the spindle 21, the plunger 111 is raised against the tension of the spring of the plunger and part 112 of the casing is given a half turn so as to disengage the shoulders 113'. The plunger 111 is thus held retracted releasing the spindle 21 for operation of the indexing devices. The plunger 111 is only engaged with the notches of the spindle when it is desired to change an indexing disk, and it will of course be understood that before the spindle is released, the tooth 106 of the pawl will be operatively engaged with a tooth of the indexing disk.

As shown in FIGURE 2, the collet or chuck 22 is actuated by means of a hand wheel 114, the latter being operatively connected to a sleeve 115 rotatably mounted through the spindle 21. The sleeve 115 is internally threaded as at 116 engaging external threads 117 of the shank of the collet. The spindle 21 is formed with an internal tapered open end 118 complemental to the jaw portions of the collet. Rotation of the hand wheel 114 in one direction will draw the jaws of the chuck against an arbor inserted therein, while a release of the jaws of the chuck or collet is effected by the opposite rotation of the hand wheel 114.

In FIGURE 13 there is shown a work head 16' wherein the gear 59 and index disk 60 have been replaced by a V-shaped pulley 119 driven by a V-belt 120 trained about a V-pulley 121 on the motor shaft 22. This type of workhead has been found practical for cylindrical grinding.

A suitable means (not shown) may be employed for stopping operation of the grinder 10 after completion of a grinding operation, and in view of the entire automatic operation of the indexing device, one operator may operate a battery of grinders.

While I have shown and described preferred forms of the invention, this is by way of illustration only, and I consider as my own all such modifications in construction as fairly fall within the scope of the appended claims.

I claim:

1. The combination of a reciprocating table, a tail stock and a combined indexing and work head mounted on said table for support of an element to be rotatably indexed, said indexing and work head including a rotatable spindle, drums rotatable about said spindle, yieldable means connected between the spindle and drums, an indexing disk operatively engaged with said spindle, one of said yieldable means tending to rotate the spindle in a counterclock-wise direction for maintaining engagement of a tooth on a tooth rest, detent means holding said indexing disk against counter clock-wise rotation, and means operable upon reciprocation of said table to actuate said indexing disk.

2. The combination of a reciprocating table, a tail stock and a combined indexing and work head mounted on said table for support of an element to be rotatably indexed, said indexing and work head including a rotatable spindle, a sleeve on said spindle having a diagonal slot formed in the periphery thereof, a stud mounted in a portion of the spindle and slidable in said slot whereby the sleeve will partake of limited longitudinal movement in either direction on said spindle, drums rotatable about said spindle, yieldable means connected between the spindle and each drum, the movement of said sleeve in one direction releasing one of said yieldable means and simultaneously engaging the other of said yieldable means, an indexing disk operatively engaged with said spindle, one of said yieldable means tending to rotate the spindle in a counter clock-wise direction for maintaining engagement of a tooth on a tooth rest, detent means holding said indexing disk against counter clockwise rotation, and means operable upon reciprocation of said table to actuate said indexing disk.

3. The combination of a reciprocating table, a tail stock and a combined indexing and work head mounted on said table for support of an element to be rotatably indexed, said indexing and work head including a rotatable spindle, drums rotatable about said spindle, a spring member connected between said spindle and detachably connected to respective drums, one of said springs being wound clockwise and the other of said springs being wound counter clockwise, a sleeve on said spindle having a diagonal extending slot formed in the periphery thereof, a stud mounted in said spindle and slidable in said slot whereby the sleeve will partake of limited longitudinal movement in either direction on said spindle, the movement of said sleeve in one direction releasing one of said springs from its associated drum and simultaneously engaging the other spring with its associated drum, an indexing disk operatively engaged with said spindle, one of said springs tending to rotate the spindle in a counter clockwise direction for maintaining engagement of a tooth on a tooth rest, detent means holding said indexing disk against counter clockwise rotation, and means operable upon reciprocation of said table to actuate said indexing disk.

4. The combination with a reciprocating table, a tail stock and a combined indexing and work head mounted on said table for support of a toothed element to be indexed against a tooth rest of a grinder, said combined indexing and work head consisting of a housing, a spindle rotatably mounted in the housing, drums rottatable about said spindle and disposed within the housing, yieldable means connected between the spindle and said drums tending to rotate the spindle in a counter clockwise direction, a toothed index disk operatively engaged with the spindle, detent means holding said indexing disk against counter clockwise rotation, an arcuate rack bar arcuately adjustable on said housing and having a pawl engageable with a tooth of the indexing disk, a worm gear mounted on the spindle, a continuously rotating shaft having a worm cooperable with the teeth of the worm gear, and means in the path of movement of the table for intermittently engaging the teeth of the worm gear and worm for rotating the indexing disk a predetermined distance.

5. The combination with a reciprocating table, a tail stock and a combined indexing and work head mounted on said table for support of a toothed element to be indexed against the tooth rest of a grinder, said combined indexing and work head consisting of a housing, a spindle rotatably mounted in the housing, drums rotatable about said spindle and disposed within the housing, resilient means connected between the spindle and said drums tending to rotate the spindle in a counter-clockwise direction, a brake shoe on said drum, an adjusting means carried by the housing and operatively engaged with the brake shoe for varying contacting engagement between the drums and the brake shoe, a toothed indexing disk operatively engaged with the spindle, detent means holding said indexing disk against counter-clockwise rotation maintaining engagement of a tooth on the tooth rest, a worm gear connected to said spindle, a continuously rotating shaft having a worm cooperable with the teeth of the worm gear and means in the path of movement of the table for intermittently engaging the teeth of the worm gear and worm for rotating the indexing disk a predetermined distance, and a spring means for releasing said detent means upon disengagement of the teeth of the worm and worm gear.

6. The combination with a reciprocating table, a tail stock and a combined indexing and work head mounted on said table for support of a toothed element to be indexed against a tooth rest of a grinder, said combined indexing and work head consisting of a housing, a spindle rotatably mounted in the housing, drums rotatable about said spindle and disposed within the housing, resilient means connected between the spindle and said drums, one of said resilient means tending to rotate the spindle in a clockwise direction, and the other resilient means tending to rotate the spindle in a counter clockwise direction, a brake shoe on said drums, an adjusting means carried by the housing and operatively engaged with the brake shoe for varying the contacting engagement between the drums and the brake shoe, a toothed indexing disk operatively engaged with the spindle, detent means holding said indexing disk against counter clockwise rotation maintaining engagement of a tooth on the tooth rest, a worm gear connected to said spindle, a continuously rotating shaft having a worm cooperable with the teeth of the worm gear, and means in the path of movement of the table for intermittently engaging the teeth of the worm gear and worm for rotating the indexing disk a predetermined distance.

7. The structure of claim 1, wherein the detent means for holding said indexing disk is circumferentially adjustable with respect to the indexing disk.

8. The structure of claim 4, wherein the spindle is provided with a multiplicity of notches formed in the periphery thereof, and a spring-urged plunger carried by the housing engageable with one of the notches for holding the spindle against rotation by said yieldable means.

9. The combination with a reciprocating table, a tail stock and a combined indexing and work head mounted on said table for support of a toothed element to be indexed against the tooth rest of a grinder, said combined indexing and work head comprising a housing, a hollow spindle rotatably mounted in the housing, a pair of drum members rotatable on the spindle, and disposed within the housing, a yieldable means connected between each drum and the spindle, one of said yieldable means tending to rotate the spindle in a clockwise direction, while the other yieldable means tending to rotate the spindle in a counter-clockwise direction maintaining engagement of a tooth and tooth rest, a brake shoe in said housing overlying said drums, an adjusting means carried by the housing and operatively engaged with the brake shoe for varying the contacting engagement between the drums and shoe, a toothed indexing disk operatively engaged with the spindle, a detent means holding said indexing disk against counter clockwise rotation, said detent means being adjustable to release a tooth of the indexing disk to provide a clearance between a pawl and indexing tooth, at which time the cutter tooth is at rest upon the tooth rest, a worm gear mounted on the spindle, a continuously rotating shaft having a worm gear cooperable with the teeth of the worm gear, means in the path of movement of the table for intermittently engaging the teeth of the worm gears for rotating the indexing disk a predetermined distance and said spindle having means for attachably and detachably mounting of an arbor.

10. The structure of claim 9, wherein the spindle is provided with a multiplicity of notches in the periphery thereof, and a spring urged plunger carried by the housing engageable with one of the notches for holding the spindle against rotation by said yieldable means.

References Cited in the file of this patent

UNITED STATES PATENTS

| | | |
|---|---|---|
| 1,842,538 | Burgess | Jan. 26, 1932 |
| 2,292,588 | Trebrueggen | Aug. 11, 1942 |
| 2,542,562 | Oliver | Feb. 20, 1951 |
| 2,746,218 | Bowie et al. | May 22, 1956 |
| 2,804,734 | Mentley | Sept. 3, 1957 |
| 2,842,905 | Rolin | July 15, 1958 |
| 3,008,382 | Howley et al. | Nov. 14, 1961 |